Figure 1:
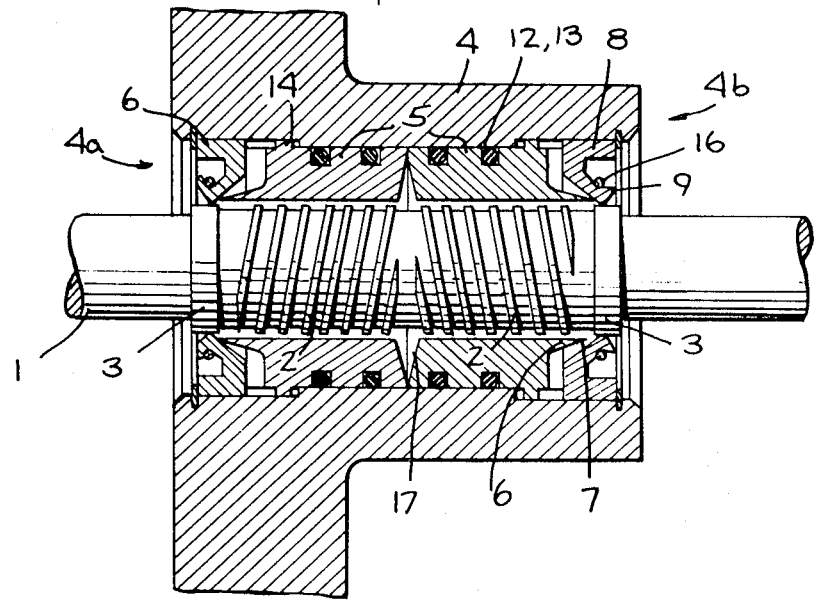

United States Patent

[11] 3,622,164

| [72] | Inventors | Werner Karl Herbert;<br>Guenther Lehn, both of Stetton, Germany |
|---|---|---|
| [21] | Appl. No. | 23,775 |
| [22] | Filed | Mar. 30, 1970 |
| [45] | Patented | Nov. 23, 1971 |
| [73] | Assignee | Dornier Systems GmbH<br>Friedrichshafen, Germany |
| [32] | Priority | Mar. 28, 1969 |
| [33] | | Germany |
| [31] | | P 19 15 934.3 |

[54] SEAL FOR SHAFTS
10 Claims, 2 Drawing Figs.

[52] U.S. Cl. ................................................. 277/27,
277/28, 277/63, 277/134
[51] Int. Cl. ........................................................ F16j 15/16
[50] Field of Search .......................................... 277/3, 27,
134, 63, 59, 28, 58

[56] References Cited
UNITED STATES PATENTS

| 2,738,208 | 3/1956 | Mylander | 277/28 X |
| 3,131,940 | 5/1964 | Ertaud | 277/28 |
| 3,355,179 | 11/1967 | McGrew, Jr. | 277/134 |
| 3,468,548 | 9/1969 | Webb | 277/134 X |

*Primary Examiner*—Samuel B. Rothberg
*Attorney*—Kenyon & Kenyon Reilly Carr & Chapin

ABSTRACT: The shaft is sealed by a combination seal which includes a liquid seal for high-shaft speeds and a radial seal for low-shaft speeds or standstill. The liquid seal is effected by the windings on the shaft which directs liquid into the chamber between the two windings. The radial seal is lifted from the shaft by the outward movement of the bushing at high-shaft speeds to avoid damage to the radial seal. The bushing moves under the pressure generated by the liquid seal.

PATENTED NOV 23 1971 3,622,164

INVENTORS
WERNER KARL HERBERT
BY GUENTHER LEHN
Kenyon & Kenyon Reilly Carr & Chapin
ATTORNEYS

SEAL FOR SHAFTS

This invention relates to a seal. More particularly, this invention relates to a combination seal for a rotary member.

Seal constructions for the sealing of machine elements, such as shafts, are generally divided into two groups. In one group, the seals contact the shaft, for example, known felt rings, radial seals and the like. The other group are concerned with labyrinth seals. In this latter group, the so-called labyrinth seal does not contact the rotating shaft but has a number of chambers in which the pressure of the medium to be sealed is reduced from one chamber to the next until no excess pressure is present at the exposed point of the shaft.

It has also been known to use various other devices in the gearing and machine tool industry for sealing shafts with respect to a casing wall. For example, if a liquid medium is present in a casing, a counterrotating winding has been provided on the shaft surface so as to prevent the liquid medium from flowing out of the casing during rotation of the shaft. In other instances, splash rings have been mounted on a shaft to prevent passage of the medium to be sealed. Because of the larger diameter of the splash ring circumference, a greater centrifugal force effect is obtained, and thus, the medium to be sealed, e.g., a lubricating medium, is radially centrifuged from the exposed end of the shaft.

These above seal constructions for shafts have, however, a common disadvantage in that such are only suitable for either high or low speeds of rotation. That is, as soon as the speed or rotation of a shaft exceeds a speed corresponding to the speed capacity of the seal, the seal becomes ineffective.

Accordingly, it is an object of the invention to provide a seal for sealing a rotary shaft at all speeds from a standstill to high speed.

It is another object of the invention to utilize a liquid seal for sealing a shaft disposed on a vertical axis.

It is another object of the invention to compensate for changes in centrifugal force of a rotating shaft in a seal disposed about the shaft.

Briefly, the invention provides a seal construction for a shaft extending through a machine casing which includes a liquid seal and at least one radial seal. The liquid seal is formed by a conveying winding or worm on the shaft surface which conveys a sealing liquid into a chamber at one end of the winding to form the liquid seal barrier between the shaft and casing. The radial seal includes a flexible packing ring which sealingly contacts the shaft at low speeds and an axially movable means within the packing ring for lifting the packing ring from the shaft at high speeds. This movable means is actuated by the pressure developed by the sealing liquid of the liquid seal. The radial seal also serves to seal the area of the liquid seal to the outside.

This seal construction is advantageous for a rotary shaft which is subjected to rotational speed ranges of from standstill to very high, e.g., as in centrigues and the like.

The seal construction of the invention is effective not only for a horizontal disposition of a shaft but also for any other position including vertical.

In one embodiment, the means for forming the liquid seal is constituted by a pair of counterrotating windings on the peripheral surface of a shaft and a charge of liquid. As the shaft rotates, the windings, which are so formed, convey the liquid from opposed directions into a chamber located between the windings. As a result, the pressure of the sealing liquid builds up in the chamber where the two windings approach each other and provides an effective sealing effect as is known. However, this sealing effect is effective only at the higher rotational speeds. Since a danger would exist during a slow rotation or for a vertical disposition of the shaft that the sealing liquid would flow to a low-pressure area, the radial seal is used. This radial seal incorporates a radial sealing ring mounted in the casing and having a packing ring for contacting the shaft and an axially movable bushing which is embedded in an opening or chamber between the shaft and the casing so as to be supported axially by the casing. This bushing has a cone-shaped annular flange which extends towards the packing ring so that the tip of the flange extends under the packing ring.

The bushing of the radial seal is positioned so that the liquid seal is located on the side opposite the radial sealing ring. In this way, as the liquid pressure builds in the chamber defined by the bushing, casing and shaft, e.g., under an increase in rotational speed of the shaft, the bushing is forced to move towards the radial sealing so that the tip of the annular flange radially expands the packing ring to lift the same from the shaft.

In use, when the shaft is at a standstill, the radial sealing ring contacts the shaft so as to seal off the casing. As the shaft starts to rotate, the radial seal remains effective while the pressure of the liquid seal begins to build. When the shaft speed further increases, the liquid seal becomes effective. The pressure of the liquid seal then forces the bushing of the radial seal towards the radial sealing ring causing a lift-off of the packing ring. After lifting of the packing ring, the liquid seal only is effective in sealing the casing while the radial seal is held inoperative. When the shaft speed reduces, the bushing retreats under the force of the packing ring returning to its original sealing position on the shaft. This movement of the packing ring can be enhanced by the use of a compression spring about the packing ring.

In another embodiment, a shaft can be provided with a pair of radial seals at opposite sides of a liquid seal so as to seal the shaft from the casing interior as well as from the casing exterior. To this end, the radial seals are symmetrically disposed relative to the liquid seal with a pair of axially movable bushings defining the chamber for the pressure medium of the liquid seal.

Figure 2:
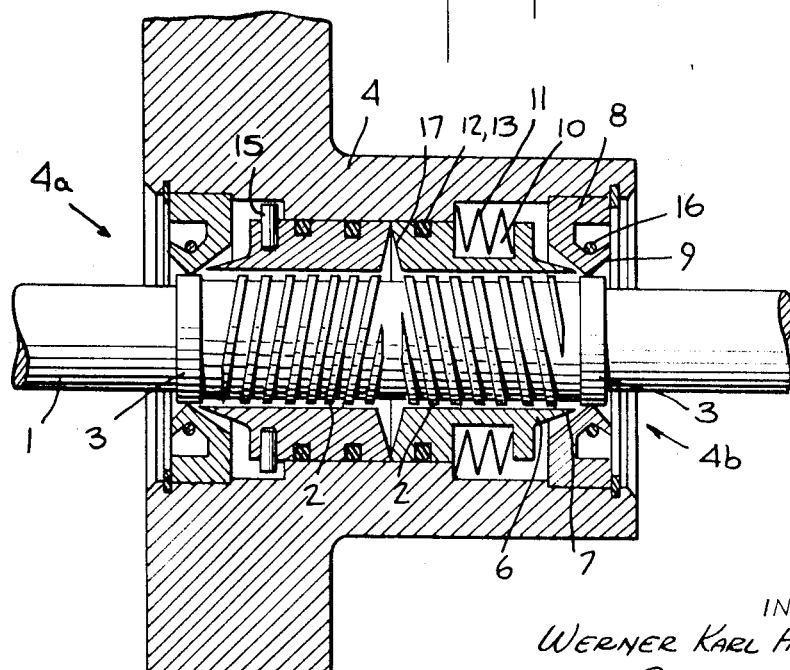

These and other objects and advantages of the invention will become more apparent from the following detailed description and appended claims taken in conjunction with the accompanying drawings in which:

FIG. 1 illustrates a cross-sectional view of a seal according to the invention between a shaft and a casing; and FIG. 2 illustrates a modified seal according to the invention.

Referring to FIG. 1, a shaft 1 which extends out of a casing 4 is provided with a combination liquid and radial seal so as to seal one side of the casing to the other side. For example, where the casing separates two pressure chambers, the seal can be effective under different pressures. If a gas is in both chambers, then a sealing liquid is used in the seal whereas if liquid is in one of the chambers, this liquid can be used as a sealing liquid.

The combination seal includes a liquid seal formed by a pair of windings 2 on the peripheral surface of the shaft 1 each of which is wound in an opposed direction to the other. The windings 2 are directed in a counterrotating manner with respect to the direction of rotation of the shaft 1 so as to meet about the middle of the seal.

In addition, the combination seal includes a pair of bushings 5 located between the respective windings 2 on the shaft 1 and the casing walls 4a, 4b and a pair of elastic radial sealing rings 8 located on opposite sides of the bushings 5. Each bushing 5 is disposed in a space between the casing 4 and shaft 1 with a slight clearance with respect to the casing 4 so as to be axially movable therein. Also, each bushing 5 has a cone-shaped annular flange 6 of wedge-shaped cross section which has a tip 7 extending towards a radial sealing ring 8. Each radial sealing ring 8 has a packing ring 9 which sealingly contacts a collar 3 on the shaft 1 located outside an adjacent winding 2. In addition, the tip 7 of the adjacent bushing flange 6 is located close to a collar 3 and a packing ring 9 contacting the collar 3.

In order to effectuate a liquid seal, a liquid medium is disposed within at least a part of the space defined by the two radial sealing rings 8. Also, in order to prevent leakage between the bushings 5 and casing bore walls 4a, 4b, the other circumferential periphery of each bushing 5 is formed with an annular groove 12 and one or more O-ring seals 13 are mounted in each. Further, in order to prevent rotation or twisting of the bushing 5, the casing walls 4a, 4b, are each formed with a longitudinal slot and each bushing 5 is provided with a radial button 14 which projects into a slot. The buttons 14 and slots are dimensioned so as to permit axial sliding of the bushings 5 in the casing 4.

Alternatively, the bottoms 14 on the bushings 5 can be omitted where the bushings 5 are fitted into the casing bore in a manner to prevent twisting.

The bushings 5 are positioned to abut each other in the area where the two windings 2 meet so as to define a small pressure medium chamber 17 for the sealing liquid. To this end, the opposed faces of the bushings 5 can be conically inclined, as shown, or can be provided with ring-shaped axial flanges.

In operation, during a standstill time for the shaft 1 as well as at low-rotational speeds of the shaft 1, the radial sealing rings 8 contact the shaft 1 via the packing rings 9 and collars 3 and effect a seal to prevent the sealing liquid from being forced out. As soon as the rotational speed of the shaft 1 increases, the sealing medium between the sealing rings 8 is transferred by the high-rotational speed of the shaft 1 and the counterrotating windings 2 to the plane of the middle of the seal i.e., into the chamber 17 between the bushings 5. The pressure then builds in the chamber 17 until becoming sufficient to move the bushings 5 axially outwardly towards the respective sealing rings 8. As the bushings 5 move outwardly, each tip 7 of a bushing 5 moves against a packing ring 9 and lifts the packing ring 9 from the respective sealing collar 3 by expanding the packing ring radially. The sealing effect of the radial sealing rings 8 is thus eliminated as the packing rings 9 no longer contact the collars 3. However, a second sealing effect is obtained at this time by the sealing liquid which is continuously conveyed towards the chamber 17 by the windings 2.

As soon as the pressure of the sealing liquid in the chamber 17 decreases due to a speed reduction, the elastic packing rings 9 which are pressing against the cone-shaped bushing flanges 6 overcome the force of the sealing liquid in the chamber 17 and move the bushings 5 against each other. In order to enhance the return of the bushings 5, the radial sealing rings 8 can each be provided with a compression spring 16 which surrounds the packing ring 15 and biases the respective packing rings 15 against the respective flanges 5 and collars 3.

It is noted that if a packing ring 9 were allowed to remain in contact on a shaft collar 3 at shaft speeds in excess of a predetermined speed, the packing ring 9 would become overstressed and would thereafter become unusuable and, possibly, volatilized. This condition is, however, prevented by the lifting of the packing rings 9 from the collars 3 under the axial movement of the bushings 5. Thus, one sealing effect is active when the shaft rotates at low speeds or is standing still and a second sealing effect is active when the shaft rotates at high speeds.

Referring to FIG. 2, wherein like reference characters indicate like parts as above, a radial cutout 10 is provided both in one of the bushings 5 and the surrounding casing wall 4b so as to mount a spring element 11 therein. This spring element 11 is mounted between the casing 4 and bushing 5 so as to bias the bushing 5 under an initial stress inwardly or outwardly in the direction of the spring tension. For example, where the seal construction is used across a pressure differential, e.g., between two casing chambers, it is necessary to have one of the bushings lift the packing ring of the radial sealing ring on the side of lower pressure before the packing ring on the side of higher pressure is lifted.

Also, instead of using a button to guide the bushings 5 against twisting, a pin 15 can be inserted in each bushing 5 and can project into the respective slots in the casing 4.

Further, it is possible to utilize a single radial seal for sealing a shaft. For example, a single bushing and a single radial sealing ring can be used. In such a case, a means such as a casing wall, is provided coaxially of and adjacent to the bushing on the side opposite the radial sealing ring so as to form the pressure medium chamber for the sealing liquid.

The invention thus provides a seal for a shaft extending through a casing which is capable of sealing at shaft standstills, at low-rotational shaft speeds and at high-rotational shaft speeds.

What is claimed is:

1. In combination with a casing and a shaft extending through said casing, a conveying winding on said shaft for conveying liquid toward a chamber at one end thereof to form a liquid seal, a radial sealing ring mounted in said casing and having a packing ring in sealing contact with said shaft at an opposite side of said winding from said chamber, and a bushing axially movably mounted between said winding and said casing and having a cone-shaped flange disposed adjacent said packing ring to lift said packing ring from said shaft upon movement of said bushing towards said radial sealing ring.

2. The combination as set forth in claim 1 further comprising a second winding disposed in counterrotation relation to said conveying winding and defining said chamber there between, a second said radial sealing ring mounted in said casing on the side of said windings opposite said other radial sealing ring and having a second packing ring in contact with said shaft and a second bushing axially movably mounted in said casing and having a cone-shaped flange disposed adjacent said second packing ring for lifting said second packing ring at high-shaft speed from said shaft.

3. The combination as set forth in claim 2 wherein each bushing has a sloped face opposed to the other bushing to define said chamber.

4. The combination as set forth in claim 1 wherein said casing includes a cutout portion and said bushing includes a cutout portion, and which further includes a spring within said cutout portions biasing said bushing relative to said casing under a predetermined initial tension.

5. The combination as set forth in claim 1 further comprising at least one O-ring seal between said bushing and said casing.

6. The combination as set forth in claim 1 further comprising means on said bushing slidably mounted in said casing for preventing twisting of said bushing in said casing.

7. A seal construction for a shaft extending through a casing comprising
    means for forming a liquid seal between the shaft and casing at relatively high-shaft speed, said means including a conveying winding for directing liquid to a chamber at one end of said winding for forming said liquid seal therein; and
    a radial seal having a flexible packing ring for sealingly contacting the shaft at relatively low-shaft speed and an axially movable means disposed adjacent said packing ring for expanding said packing ring upon axial movement of said latter means outwardly of said radial seal under an increase in pressure in said chamber.

8. A seal as set forth in claim 7 wherein said radial seal includes an annular compression ring about said packing ring for biasing said packing ring radially inwardly.

9. In combination,
    a casing,
    a shaft extending through said casing and having at least one conveying winding thereon for directing liquid into a chamber at one end of said winding,
    at least one radial sealing ring mounted in said casing in sealing contact with said shaft, and
    at least one bushing axially movably mounted about said winding between said chamber and said radial sealing ring, said bushing having a means thereon for lifting said radial sealing ring from said shaft upon movement towards said radial sealing ring under a predetermined pressure in said chamber.

10. The combination as set forth in claim 9 comprising a pair of said windings disposed in counterrotating relation to define said chamber therebetween, a pair of said sealing rings on opposite sides of said windings for sealingly contacting said shaft, and a pair of said bushings between said radial sealing rings for lifting said sealing rings from said shaft upon movement towards said respective sealing rings and defining said chamber with said windings.